United States Patent
Gordon et al.

(10) Patent No.: US 9,779,924 B2
(45) Date of Patent: Oct. 3, 2017

(54) MASS SPECTROMETER

(71) Applicant: Micromass UK Limited, Wilmslow (GB)

(72) Inventors: David Gordon, Manchester (GB); Daniel James Kenny, Knutsford (GB); Richard Barrington Moulds, Stockport (GB)

(73) Assignee: Micromass UK Limited, Wilmslow (GB)

( * ) Notice: Subject to any disclaimer, the term of this patent is extended or adjusted under 35 U.S.C. 154(b) by 0 days.

(21) Appl. No.: 15/022,634

(22) PCT Filed: Sep. 17, 2014

(86) PCT No.: PCT/GB2014/052825
§ 371 (c)(1),
(2) Date: Mar. 17, 2016

(87) PCT Pub. No.: WO2015/040391
PCT Pub. Date: Mar. 26, 2015

(65) Prior Publication Data
US 2016/0233067 A1  Aug. 11, 2016

(30) Foreign Application Priority Data

Sep. 20, 2013 (EP) ..................................... 13185440
Sep. 20, 2013 (GB) .................................. 1316767.1

(51) Int. Cl.
*H01J 49/02* (2006.01)
*H01J 49/04* (2006.01)
*H01J 49/00* (2006.01)
*H01J 49/10* (2006.01)
*G01F 1/68* (2006.01)

(52) U.S. Cl.
CPC ........ *H01J 49/025* (2013.01); *H01J 49/0027* (2013.01); *H01J 49/0422* (2013.01); *H01J 49/10* (2013.01); *G01F 1/68* (2013.01)

(58) Field of Classification Search
USPC ...................................... 250/423 R, 424, 288
See application file for complete search history.

(56) References Cited

U.S. PATENT DOCUMENTS

| | | |
|---|---|---|
| 3,742,213 A | 6/1973 | Cohen |
| 4,861,989 A | 8/1989 | Vestal et al. |
| 4,958,529 A | 9/1990 | Vestal |
| 5,965,813 A | 10/1999 | Wan et al. |

(Continued)

OTHER PUBLICATIONS

Brooks Instrument, "*Thermal Mass Flow Controllers and Meters*", <http://www.brooksinstrument.com/flow-pressure-level-measurement-technology/thermal-mass-flow.html>, 2013.

(Continued)

*Primary Examiner* — Kiet T Nguyen
(74) *Attorney, Agent, or Firm* — Diederiks & Whitelaw, PLC

(57) ABSTRACT

Apparatus for a mass spectrometer is disclosed comprising an ion source, a heater for heating a gas flow to the ion source, a temperature sensor for monitoring the temperature of the heater, and a control system. The control system is arranged and adapted to determine a flow rate of the gas flow by monitoring the power supplied to the heater and the temperature of the heater.

23 Claims, 3 Drawing Sheets

(56) References Cited

U.S. PATENT DOCUMENTS

| | | | |
|---|---|---|---|
| 6,147,347 | A | 11/2000 | Hirabayashi et al. |
| 6,149,882 | A | 11/2000 | Guan et al. |
| 6,474,155 | B1 | 11/2002 | Berkcan et al. |
| 6,527,835 | B1 | 3/2003 | Manginell et al. |
| 6,630,663 | B2 | 10/2003 | Murphy et al. |
| 6,658,931 | B1 | 12/2003 | Plumb et al. |
| 8,679,333 | B2 | 3/2014 | Gerhardt et al. |
| 9,240,311 | B2 | 1/2016 | Whitehouse et al. |
| 2003/0062474 | A1 | 4/2003 | Baranov et al. |
| 2003/0193019 | A1* | 10/2003 | Nagano .............. H01J 49/0031 250/281 |
| 2004/0094706 | A1 | 5/2004 | Covey et al. |
| 2013/0168548 | A1* | 7/2013 | Wang .................... A61B 5/082 250/288 |
| 2013/0213150 | A1 | 8/2013 | Covey et al. |

OTHER PUBLICATIONS

"*Instruction Manual Mass Flow/Pressure Meters and Controllers for Gases and Liquids*", <http://www.bronkhorst.com/files/downloads/manuals_english/917001manual_mass_flow_pressure_meters_controllers.pdf>, 2011.

Leight, "*Brooks Model 5850E Mas Flow Controller*", <http://www.brooksinstrument.com/downloads/product%20documentation/thermal%20mass%20flow%20meters%20controllers%20analog%20gas/data%20sheets/ds-tmf-5850e-mfc-eng.pdf>, 2008.

"*Thermal Mass Flow Meter*", <en.Wikipedia/org/w/index.php?title=Thermal_Mass_Flow_Meter&oldid=572270685>, 2013.

* cited by examiner

MASS SPECTROMETER

CROSS REFERENCE TO RELATED APPLICATIONS

This application is the National Stage of International Application No. PCT/GB2014/052825, filed 17 Sep. 2014 which claims priority from and the benefit of United Kingdom patent application No. 1316767.1 filed on 20 Sep. 2013 and European patent application No. 13185440.8 filed on 20 Sep. 2013. The entire contents of these applications are incorporated herein by reference.

BACKGROUND OF THE PRESENT INVENTION

The present invention relates to the field of mass spectrometry.

In mass spectrometers ion sources require heating to high temperatures in order to provide optimum performance from the ion source. Similarly, gas flows are required to aid the ionisation of analytes within the instrument. Often the gas flows are required to be at high temperatures in order to optimise the ionisation of the analytes within the instrument.

In order to provide the required gas flows, at the required temperatures, a heater is required to heat the flow of gas provided to the ion source. Sensors and control mechanisms are placed in the apparatus to measure and control the gas flow to the ion source, and the temperature of the heater that the flow is subjected to.

An example of a conventional gas flow sensor is described in the document "Mass Flow/Pressure meters and controllers for gases and liquids" (Bronkhorst). This document discloses a gas flow sensor comprising two spaced temperature sensors, where the difference in temperature between the two sensors is used to determine a gas flow. If there is no gas flow then both temperature sensors will register the same temperature. When a gas flow is present, a temperature profile develops between the two sensors, which can be used to determine the gas flow.

Increasingly, mass spectrometer manufacturers are trying to reduce the costs involved in the manufacture of instruments, whilst producing reliable, accurate and efficient instruments, which are easy to use. One particularly desirable feature is self contained diagnostics which will automatically alert the user in the event of failures.

However, gas flow sensors to monitor the gas flow, such as the gas flow sensor described in Bronkhurst, can be expensive, which leads to higher cost for the design of instruments.

It is therefore desirable to provide a system for monitoring a gas flow which does not require expensive sensors, yet does allow self contained, automatic alert systems in the event of a failure within the gas flow to the ion source of the mass spectrometer.

It is desired to provide an improved mass spectrometer.

SUMMARY OF THE INVENTION

According to an aspect of the present invention, there is provided apparatus comprising:
an ion source;
a heater for heating a gas flow to the ion source;
a temperature sensor for monitoring the temperature of the heater; and
a control system arranged and adapted:
(i) to determine a flow rate of the gas flow by monitoring the power supplied to the heater and the temperature of the heater.

The preferred embodiment of the present invention relates to apparatus for a mass spectrometer. In the present invention, the temperature of a heater for heating a gas flow to an ion source is monitored, as well as the power supplied to the heater. This is then used to determine the flow rate of the gas flow.

According to the preferred embodiment, the heater is a heater that is already present in the apparatus or mass spectrometer, preferably for some purpose other than determining a gas flow rate. In a preferred such embodiment, the heater comprises as a desolvation heater. Similarly, the temperature sensor is preferably a sensor that is already present in the apparatus or mass spectrometer, preferably for some purpose other than determining a gas flow rate. In a preferred such embodiment, the temperature sensor comprises a temperature sensor for monitoring the temperature of a desolvation heater, e.g., for regulatory purposes (i.e. to ensure that its temperature does not exceed a maximum value).

According to the preferred embodiment, the flow rate of the gas flow is determined by monitoring only the power supplied to the heater and the temperature of the heater. The determination of the flow rate is preferably made by monitoring a single heater, preferably using a single temperature sensor.

The Applicants have recognised that it is possible to determine the flow rate of a gas flow using such pre-existing sensors in a mass spectrometer. This means that it is not therefore necessary to provide additional sensors for this purpose, such as gas flow sensors. Furthermore, the apparatus of the present invention is able to monitor the gas flow using only a single heater and a single temperature sensor.

It will be appreciated, therefore, that the present invention provides a simple and effective gas flow monitor, without the need to provide additional sensors. Accordingly, the apparatus is cheaper to produce and is more reliable in use, due to the reduction of the number of sensors required.

In contrast with the present invention, conventional gas flow sensors, such as the gas flow sensor described in the document "Mass Flow/Pressure meters and controllers for gases and liquids" (Bronkhorst), typically comprise two spaced temperature sensors. Furthermore, such gas flow sensors are separate, standalone gas flow sensors that are to be provided independently of any existing sensors within an instrument such as a mass spectrometer.

It will be appreciated, therefore, that the present invention represents an improvement over the gas flow sensors described in the prior art, and that the present invention provides an improved mass spectrometer.

In an embodiment, the gas flow is arranged to be actively used in the ionization process in the ion source.

In an embodiment, the gas flow comprises a desolvation gas flow.

In an embodiment, the heater comprises a resistive heater.

In an embodiment, the heater comprises a desolvation gas heater.

In an embodiment, the temperature sensor is arranged and adapted to monitor the temperature of the heater so as to ensure that the temperature is below a maximum value.

In an embodiment, the temperature sensor comprises a temperature sensor for monitoring the temperature of a desolvation gas heater.

In an embodiment, the control system is arranged and adapted to determine the flow rate of the gas flow by monitoring only the power supplied to the heater and the temperature of the heater.

In an embodiment, the control system is arranged and adapted to determine the flow rate of the gas flow by:
monitoring the temperature of the heater;
determining when the temperature of the heater has stabilised; and then
monitoring the power supplied to the heater.

In an embodiment, the control system is arranged and adapted to determine the flow rate of the gas flow by:
monitoring the temperature of the heater;
determining when the temperature of the heater has stabilised to a desired value; and then
monitoring the power supplied to the heater.

In an embodiment, the control system is arranged and adapted to determine that the temperature has stabilised when the temperature has been substantially constant for a particular period of time.

In an embodiment, the particular period of time is selected from the group consisting of: (i) <1 s; (ii) 1-5 s; (iii) 5-10 s; (iv) 10-15 s; (v) 15-20 s; (vi) >20 s.

In an embodiment, the control system is arranged and adapted to determine the flow rate of the gas flow by:
monitoring the rate of change of the power supplied to the heater; and/or
monitoring the rate of change of the temperature of the heater.

In an embodiment, the control system is arranged and adapted to determine the flow rate of the gas flow by comparing (i) the power supplied to the heater; (ii) the temperature of the heater; (iii) a ratio of the power supplied to the heater to the temperature of the heater; (iv) a rate of change of the power supplied to the heater; (v) a rate of change of the temperature of the heater; and/or (vi) a ratio of a rate of change of the power supplied to the heater to a rate of change of the temperature of the heater, with one or more expected or threshold values.

In an embodiment, the control system is arranged and adapted to determine the flow rate of the gas flow by determining whether (i) the power supplied to the heater; (ii) the temperature of the heater; (iii) the ratio of the power supplied to the heater to the temperature of the heater; (iv) the rate of change of the power supplied to the heater; (v) the rate of change of the temperature of the heater; and/or (vi) the ratio of the rate of change of the power supplied to the heater to the rate of change of the temperature of the heater is:
substantially equal to or not substantially equal to the one or more expected values;
above or below a minimum threshold value; and/or
above or below a maximum threshold value.

In an embodiment, the control system is arranged and adapted to determine the flow rate of the gas flow by determining whether the flow rate of the gas flow is:
substantially equal to or not substantially equal to an expected flow rate;
above or below a minimum threshold flow rate; and/or
above or below a maximum threshold flow rate.

In an embodiment, the control system is arranged and adapted:
if the flow rate of the gas is determined to be above the maximum threshold flow rate, to reduce the flow rate of the gas; and/or
if the flow rate of the gas is determined to be below the minimum threshold flow rate, to increase the flow rate of the gas.

In an embodiment, the control system is arranged and adapted to provide an alert in the event of an unexpected value of or change to the temperature of the heater and/or the power supplied to the heater and/or the flow rate of the gas.

In an embodiment, the ion source comprises an atmospheric pressure ion source.

In an embodiment, the ion source comprises an electrospray ion source, an atmospheric pressure chemical ionisation ion source, or an impactor-spray ion source.

According to another aspect of the present invention, there is provided a mass spectrometer comprising apparatus as described above.

According to another aspect of the present invention, there is provided a method comprising:
providing an ion source;
heating a gas flow using a heater and providing the gas flow to the ion source;
monitoring the temperature of the heater; and
determining a flow rate of the gas flow by monitoring the power supplied to the heater and the temperature of the heater.

According to another aspect of the present invention, there is provided a method of mass spectrometry comprising the method described above.

According to another aspect of the present invention, there is provided a system for monitoring a gas flow to an ion source for a mass spectrometer comprising:
a gas source for providing a gas flow;
a thermal source for providing thermal energy to the gas flow;
a temperature sensor for providing a measurement of the temperature of the thermal source; and
a control system wherein said control system is adapted to monitor changes to the measurement of the temperature of the thermal source relative to the thermal energy provided by the thermal source, to monitor the gas flow.

The apparatus according to the invention has the advantage of providing a monitor of the gas flow to the ion source of a mass spectrometer in a simple, and effective way, without the need for flow sensors. Furthermore, the apparatus is cheaper to produce and is more reliable in use, due to the reduction of the number of sensors required.

Preferably the thermal source is a heater.

In some embodiments the thermal source is a resistive heater.

In one embodiment the control system has diagnostic ability to assess the rate of the flow of gas past the thermal source by monitoring the change of the measurement of the temperature of the thermal source relative to the thermal energy provided by the thermal source.

In some embodiments the flow of gas is arranged to flow into an atmospheric pressure ion source.

In some embodiments the ion source is an electrospray ion source.

In some embodiments the ion source is an atmospheric pressure chemical ionisation ion source.

In one embodiment the ion source is an impactor-spray ion source.

In the preferred embodiment the flow of gas is arranged to be actively used in the ionization process in the ion source.

In some embodiments the flow of gas is arranged to flow into an atmospheric pressure ion source and said control system is preferably adapted to monitor changes to the measurement of the temperature of the thermal source relative to the thermal energy provided by the thermal source and the control system is further adapted to alert an operating system in the event of unexpected changes to the measurement of the temperature of the thermal source relative to the thermal energy provided by the thermal source.

In some embodiments the mass spectrometer is a miniature mass spectrometer.

According to an embodiment the mass spectrometer may further comprise:

(a) an ion source selected from the group consisting of: (i) an Electrospray ionisation ("ESI") ion source; (ii) an Atmospheric Pressure Photo Ionisation ("APPI") ion source; (iii) an Atmospheric Pressure Chemical Ionisation ("APCI") ion source; (iv) a Matrix Assisted Laser Desorption Ionisation ("MALDI") ion source; (v) a Laser Desorption Ionisation ("LDI") ion source; (vi) an Atmospheric Pressure Ionisation ("API") ion source; (vii) a Desorption Ionisation on Silicon ("DIOS") ion source; (viii) an Electron Impact ("EI") ion source; (ix) a Chemical Ionisation ("CI") ion source; (x) a Field Ionisation ("FI") ion source; (xi) a Field Desorption ("FD") ion source; (xii) an Inductively Coupled Plasma ("ICP") ion source; (xiii) a Fast Atom Bombardment ("FAB") ion source; (xiv) a Liquid Secondary Ion Mass Spectrometry ("LSIMS") ion source; (xv) a Desorption Electrospray Ionisation ("DESI") ion source; (xvi) a Nickel-63 radioactive ion source; (xvii) an Atmospheric Pressure Matrix Assisted Laser Desorption Ionisation ion source; (xviii) a Thermospray ion source; (xix) an Atmospheric Sampling Glow Discharge Ionisation ("ASGDI") ion source; (xx) a Glow Discharge ("GD") ion source; (xxi) an Impactor ion source; (xxii) a Direct Analysis in Real Time ("DART") ion source; (xxiii) a Laserspray Ionisation ("LSI") ion source; (xxiv) a Sonicspray Ionisation ("SSI") ion source; (xxv) a Matrix Assisted Inlet Ionisation ("MAII") ion source; (xxvi) a Solvent Assisted Inlet Ionisation ("SAII") ion source; (xxvii) a Desorption Electrospray Ionisation ("DESI") ion source; and (xxviii) a Laser Ablation Electrospray Ionisation ("LAESI") ion source; and/or (b) one or more continuous or pulsed ion sources; and/or (c) one or more ion guides; and/or (d) one or more ion mobility separation devices and/or one or more Field Asymmetric Ion Mobility Spectrometer devices; and/or (e) one or more ion traps or one or more ion trapping regions; and/or (f) one or more collision, fragmentation or reaction cells selected from the group consisting of: (i) a Collisional Induced Dissociation ("CID") fragmentation device; (ii) a Surface Induced Dissociation ("SID") fragmentation device; (iii) an Electron Transfer Dissociation ("ETD") fragmentation device; (iv) an Electron Capture Dissociation ("ECD") fragmentation device; (v) an Electron Collision or Impact Dissociation fragmentation device; (vi) a Photo Induced Dissociation ("PID") fragmentation device; (vii) a Laser Induced Dissociation fragmentation device; (viii) an infrared radiation induced dissociation device; (ix) an ultraviolet radiation induced dissociation device; (x) a nozzle-skimmer interface fragmentation device; (xi) an in-source fragmentation device; (xii) an in-source Collision Induced Dissociation fragmentation device; (xiii) a thermal or temperature source fragmentation device; (xiv) an electric field induced fragmentation device; (xv) a magnetic field induced fragmentation device; (xvi) an enzyme digestion or enzyme degradation fragmentation device; (xvii) an ion-ion reaction fragmentation device; (xviii) an ion-molecule reaction fragmentation device; (xix) an ion-atom reaction fragmentation device; (xx) an ion-metastable ion reaction fragmentation device; (xxi) an ion-metastable molecule reaction fragmentation device; (xxii) an ion-metastable atom reaction fragmentation device; (xxiii) an ion-ion reaction device for reacting ions to form adduct or product ions; (xxiv) an ion-molecule reaction device for reacting ions to form adduct or product ions; (xxv) an ion-atom reaction device for reacting ions to form adduct or product ions; (xxvi) an ion-metastable ion reaction device for reacting ions to form adduct or product ions; (xxvii) an ion-metastable molecule reaction device for reacting ions to form adduct or product ions; (xxviii) an ion-metastable atom reaction device for reacting ions to form adduct or product ions; and (xxix) an Electron Ionisation Dissociation ("EID") fragmentation device; and/or (g) a mass analyser selected from the group consisting of: (i) a quadrupole mass analyser; (ii) a 2D or linear quadrupole mass analyser; (iii) a Paul or 3D quadrupole mass analyser; (iv) a Penning trap mass analyser; (v) an ion trap mass analyser; (vi) a magnetic sector mass analyser; (vii) Ion Cyclotron Resonance ("ICR") mass analyser; (viii) a Fourier Transform Ion Cyclotron Resonance ("FTICR") mass analyser; (ix) an electrostatic mass analyser arranged to generate an electrostatic field having a quadro-logarithmic potential distribution; (x) a Fourier Transform electrostatic mass analyser; (xi) a Fourier Transform mass analyser; (xii) a Time of Flight mass analyser; (xiii) an orthogonal acceleration Time of Flight mass analyser; and (xiv) a linear acceleration Time of Flight mass analyser; and/or (h) one or more energy analysers or electrostatic energy analysers; and/or (i) one or more ion detectors; and/or (j) one or more mass filters selected from the group consisting of: (i) a quadrupole mass filter; (ii) a 2D or linear quadrupole ion trap; (iii) a Paul or 3D quadrupole ion trap; (iv) a Penning ion trap; (v) an ion trap; (vi) a magnetic sector mass filter; (vii) a Time of Flight mass filter; and (viii) a Wien filter; and/or (k) a device or ion gate for pulsing ions; and/or (l) a device for converting a substantially continuous ion beam into a pulsed ion beam.

The mass spectrometer may further comprise either:

(i) a C-trap and a mass analyser comprising an outer barrel-like electrode and a coaxial inner spindle-like electrode that form an electrostatic field with a quadro-logarithmic potential distribution, wherein in a first mode of operation ions are transmitted to the C-trap and are then injected into the mass analyser and wherein in a second mode of operation ions are transmitted to the C-trap and then to a collision cell or Electron Transfer Dissociation device wherein at least some ions are fragmented into fragment ions, and wherein the fragment ions are then transmitted to the C-trap before being injected into the mass analyser; and/or (ii) a stacked ring ion guide comprising a plurality of electrodes each having an aperture through which ions are transmitted in use and wherein the spacing of the electrodes increases along the length of the ion path, and wherein the apertures in the electrodes in an upstream section of the ion guide have a first diameter and wherein the apertures in the electrodes in a downstream section of the ion guide have a second diameter which is smaller than the first diameter, and wherein opposite phases of an AC or RF voltage are applied, in use, to successive electrodes.

According to an embodiment the mass spectrometer further comprises a device arranged and adapted to supply an AC or RF voltage to the electrodes. The AC or RF voltage preferably has an amplitude selected from the group consisting of: (i) <50 V peak to peak; (ii) 50-100 V peak to peak; (iii) 100-150 V peak to peak; (iv) 150-200 V peak to peak; (v) 200-250 V peak to peak; (vi) 250-300 V peak to peak; (vii) 300-350 V peak to peak; (viii) 350-400 V peak to peak; (ix) 400-450 V peak to peak; (x) 450-500 V peak to peak; and (xi) >500 V peak to peak.

The AC or RF voltage preferably has a frequency selected from the group consisting of: (i) <100 kHz; (ii) 100-200 kHz; (iii) 200-300 kHz; (iv) 300-400 kHz; (v) 400-500 kHz; (vi) 0.5-1.0 MHz; (vii) 1.0-1.5 MHz; (viii) 1.5-2.0 MHz; (ix) 2.0-2.5 MHz; (x) 2.5-3.0 MHz; (xi) 3.0-3.5 MHz; (xii) 3.5-4.0 MHz; (xiii) 4.0-4.5 MHz; (xiv) 4.5-5.0 MHz; (xv) 5.0-5.5 MHz; (xvi) 5.5-6.0 MHz; (xvii) 6.0-6.5 MHz; (xviii) 6.5-7.0 MHz; (xix) 7.0-7.5 MHz; (xx) 7.5-8.0 MHz; (xxi) 8.0-8.5 MHz; (xxii) 8.5-9.0 MHz; (xxiii) 9.0-9.5 MHz; (xxiv) 9.5-10.0 MHz; and (xxv) >10.0 MHz.

The mass spectrometer may also comprise a chromatography or other separation device upstream of an ion source. According to an embodiment the chromatography separation device comprises a liquid chromatography or gas chromatography device. According to another embodiment the separation device may comprise: (i) a Capillary Electrophoresis ("CE") separation device; (ii) a Capillary Electrochromatography ("CEC") separation device; (iii) a substantially rigid ceramic-based multilayer microfluidic substrate ("ceramic tile") separation device; or (iv) a supercritical fluid chromatography separation device.

The mass spectrometer may comprise a chromatography detector.

The chromatography detector may comprise a destructive chromatography detector preferably selected from the group consisting of: (i) a Flame Ionization Detector ("FID"); (ii) an aerosol-based detector or Nano Quantity Analyte Detector ("NQAD"); (iii) a Flame Photometric Detector ("FPD"); (iv) an Atomic-Emission Detector ("AED"); (v) a Nitrogen Phosphorus Detector ("NPD"); and (vi) an Evaporative Light Scattering Detector ("ELSD").

Additionally or alternatively, the chromatography detector may comprise a non-destructive chromatography detector preferably selected from the group consisting of: (i) a fixed or variable wavelength UV detector; (ii) a Thermal Conductivity Detector ("TCD"); (iii) a fluorescence detector; (iv) an Electron Capture Detector ("ECD"); (v) a conductivity monitor; (vi) a Photoionization Detector ("PID"); (vii) a Refractive Index Detector ("RID"); (viii) a radio flow detector; and (ix) a chiral detector.

The ion guide is preferably maintained at a pressure selected from the group consisting of: (i) <0.0001 mbar; (ii) 0.0001-0.001 mbar; (iii) 0.001-0.01 mbar; (iv) 0.01-0.1 mbar; (v) 0.1-1 mbar; (vi) 1-10 mbar; (vii) 10-100 mbar; (viii) 100-1000 mbar; and (ix) >1000 mbar.

According to an embodiment analyte ions may be subjected to Electron Transfer Dissociation ("ETD") fragmentation in an Electron Transfer Dissociation fragmentation device. Analyte ions are preferably caused to interact with ETD reagent ions within an ion guide or fragmentation device.

According to an embodiment in order to effect Electron Transfer Dissociation either: (a) analyte ions are fragmented or are induced to dissociate and form product or fragment ions upon interacting with reagent ions; and/or (b) electrons are transferred from one or more reagent anions or negatively charged ions to one or more multiply charged analyte cations or positively charged ions whereupon at least some of the multiply charged analyte cations or positively charged ions are induced to dissociate and form product or fragment ions; and/or (c) analyte ions are fragmented or are induced to dissociate and form product or fragment ions upon interacting with neutral reagent gas molecules or atoms or a non-ionic reagent gas; and/or (d) electrons are transferred from one or more neutral, non-ionic or uncharged basic gases or vapours to one or more multiply charged analyte cations or positively charged ions whereupon at least some of the multiply charged analyte cations or positively charged ions are induced to dissociate and form product or fragment ions; and/or (e) electrons are transferred from one or more neutral, non-ionic or uncharged superbase reagent gases or vapours to one or more multiply charged analyte cations or positively charged ions whereupon at least some of the multiply charge analyte cations or positively charged ions are induced to dissociate and form product or fragment ions; and/or (f) electrons are transferred from one or more neutral, non-ionic or uncharged alkali metal gases or vapours to one or more multiply charged analyte cations or positively charged ions whereupon at least some of the multiply charged analyte cations or positively charged ions are induced to dissociate and form product or fragment ions; and/or (g) electrons are transferred from one or more neutral, non-ionic or uncharged gases, vapours or atoms to one or more multiply charged analyte cations or positively charged ions whereupon at least some of the multiply charged analyte cations or positively charged ions are induced to dissociate and form product or fragment ions, wherein the one or more neutral, non-ionic or uncharged gases, vapours or atoms are selected from the group consisting of: (i) sodium vapour or atoms; (ii) lithium vapour or atoms; (iii) potassium vapour or atoms; (iv) rubidium vapour or atoms; (v) caesium vapour or atoms; (vi) francium vapour or atoms; (vii) C60 vapour or atoms; and (viii) magnesium vapour or atoms.

The multiply charged analyte cations or positively charged ions preferably comprise peptides, polypeptides, proteins or biomolecules.

According to an embodiment in order to effect Electron Transfer Dissociation: (a) the reagent anions or negatively charged ions are derived from a polyaromatic hydrocarbon or a substituted polyaromatic hydrocarbon; and/or (b) the reagent anions or negatively charged ions are derived from the group consisting of: (i) anthracene; (ii) 9,10 diphenyl-anthracene; (iii) naphthalene; (iv) fluorine; (v) phenanthrene; (vi) pyrene; (vii) fluoranthene; (viii) chrysene; (ix) triphenylene; (x) perylene; (xi) acridine; (xii) 2,2' dipyridyl; (xiii) 2,2' biquinoline; (xiv) 9-anthracenecarbonitrile; (xv) dibenzothiophene; (xvi) 1,10'-phenanthroline; (xvii) 9' anthracenecarbonitrile; and (xviii) anthraquinone; and/or (c) the reagent ions or negatively charged ions comprise azobenzene anions or azobenzene radical anions.

According to a particularly preferred embodiment the process of Electron Transfer Dissociation fragmentation comprises interacting analyte ions with reagent ions, wherein the reagent ions comprise dicyanobenzene, 4-nitrotoluene or azulene.

BRIEF DESCRIPTION OF THE DRAWINGS

Various embodiments of the present invention will now be described, by way of example only, and with reference to the accompanying drawings in which.

DETAILED DESCRIPTION OF PREFERRED EMBODIMENTS

Detailed Description of the Preferred Embodiment

Figure 1:
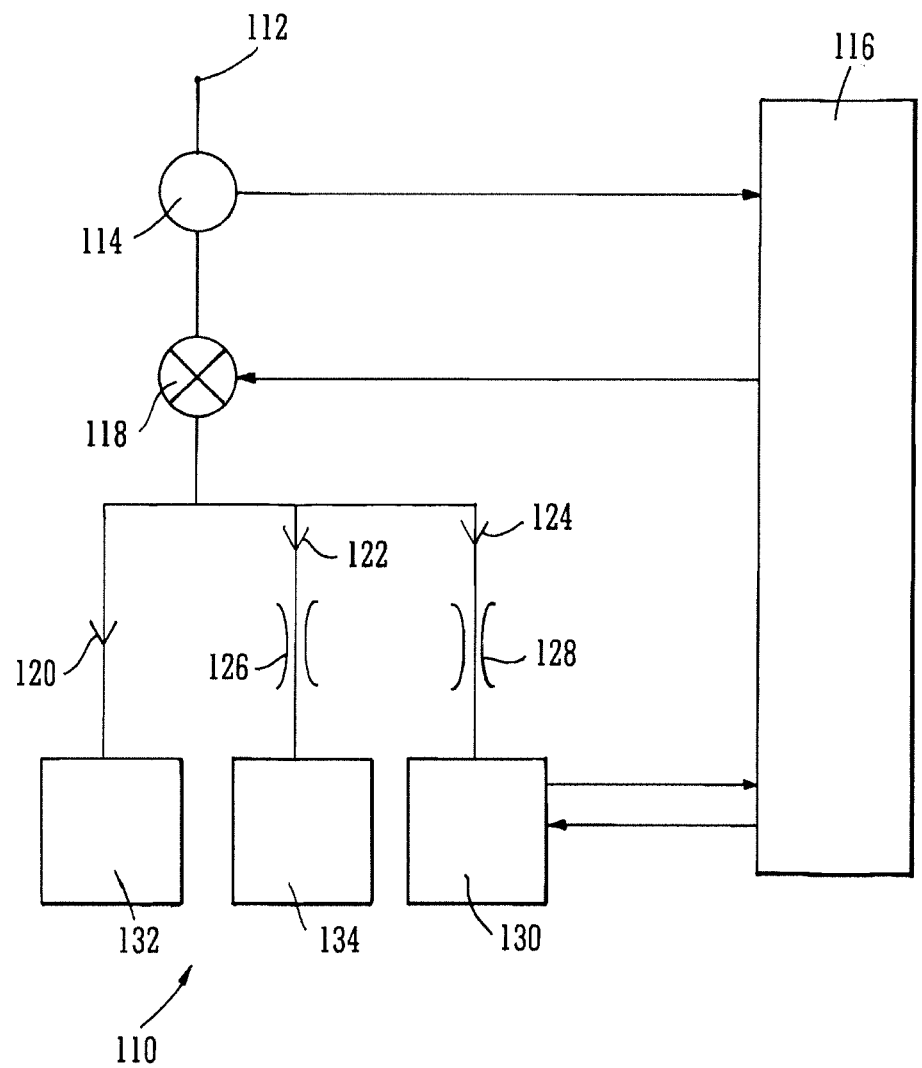
FIG. 1 is a schematic of an arrangement according to the prior art.

FIG. 1 is a schematic illustration of an atmospheric pressure ionisation (API) gas supply system 110 for a mass spectrometer according to the prior art. In this arrangement a mass spectrometer is provided with an atmospheric pressure ionisation gas source 112. The gas source 112 is arranged so that a gas flow is created from the gas source 112 towards a mass spectrometer's ion source (not shown). The gas flow continues from the gas source into an atmospheric pressure ionisation gas pressure sensor and transducer 114. The pressure sensor and transducer 114 pass a signal to the electronics 116 of the instrument to advise if the gas source flow is at the desired rate and pressure. After the gas pressure sensor and transducer 114, the gas flow will then be passed to an atmospheric pressure ionisation gas solenoid valve 118, which allows on/off control of the gas flow continuing to the ion source. This is controlled by the instrument electronics 116. The gas flow is then split into three different streams, a nebuliser gas flow 120, a sample cone gas flow 122 and a desolvation gas flow 124.

The nebuliser gas flow 120 is provided to the ion source where the nebuliser gas flows around a probe 132 providing sample to the ion source to assist with the spraying of sample from the probe tip into the ion source volume.

The sample cone gas flow 122 passes through a restrictor 126 to change the flow rate to a sample cone 134 of the mass spectrometer to the desired rate.

The desolvation gas flow 124 passes a restrictor 128, and a desolvation heater 130 which provides heat to the desolvation gas flow 124. The heated desolvation gas is then provided to the ion source, as is known in the art.

Figure 2:
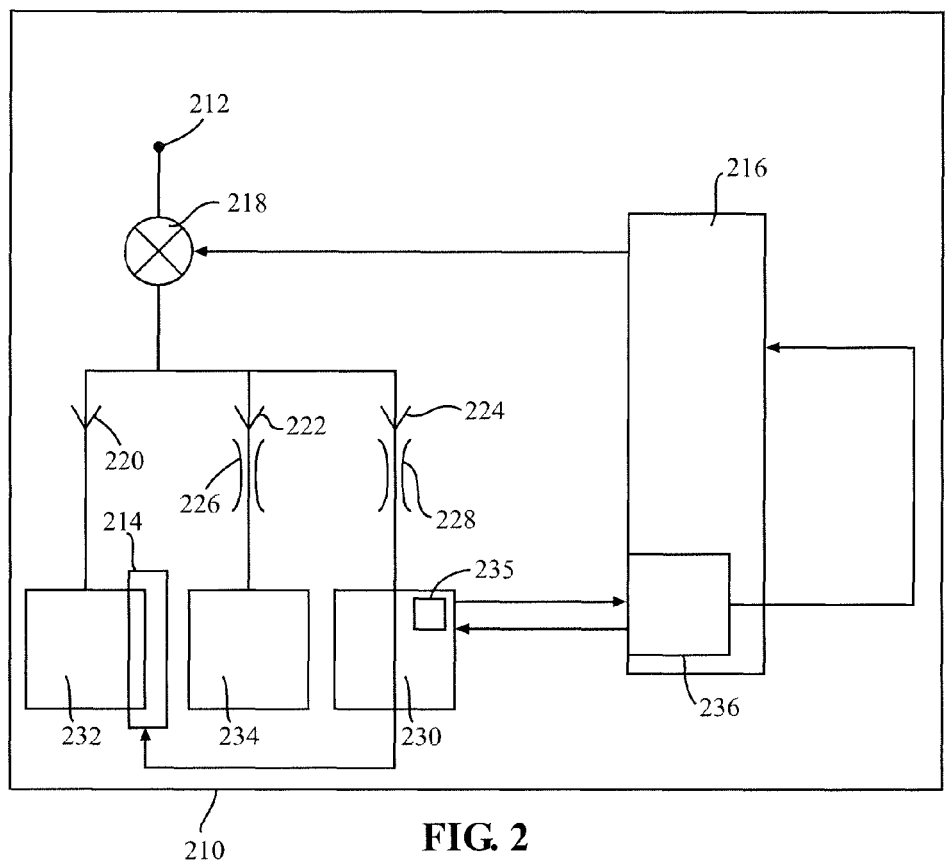
FIG. 2 is a schematic of an embodiment of the invention.

FIG. 2 is a schematic of one embodiment of the invention. In this embodiment a mass spectrometer 210 is provided with an atmospheric pressure ionisation gas source 212. The gas supply is arranged so that a gas flow is created from the gas source 212 towards the mass spectrometer's ion source 214. The gas flow continues from the gas source (preferably directly) into a gas valve 218. (Preferably, no pressure sensor/transducer is provided.) The gas valve 218 provides on/off control of the gas flow continuing to the ion source 214. This is controlled by the instrument electronics 216. The gas flow is then split into three different streams, a nebuliser gas flow 220, a sample cone gas flow 222 and a desolvation gas flow 224.

The nebuliser gas flow 220 is provided to the ion source 214 where the nebuliser gas flows around a probe 232 providing sample to the ion source 214 to assist with the spraying of sample from the probe tip into the ion source volume.

The sample cone gas flow 222 passes through a restrictor 226 to change the flow rate to a sample cone 234 of the mass spectrometer to the desired rate.

The desolvation gas flow 224 passes a restrictor 228, and a heater 230 which may be a gas desolvation or resistive heater and which provides heat to the desolvation gas flow 224. The heated desolvation gas is then provided to the ion source, as is known in the art.

A temperature sensor 235 measures the temperature of the desolvation heater 230 as power is provided to it. The desolvation heater temperature is monitored by the control system 236, within the electronics 216. As the gas flow passes the desolvation heater 230, the temperature of the desolvation heater 230 is reduced by the transfer of heat from the desolvation heater 230 to the gas flow passing the desolvation heater 230. The rate of flow of gas past the desolvation heater 230 is measurable by monitoring the temperature of the desolvation heater 230 with the knowledge of the power provided to the desolvation heater 230. Using this measurement, the flow of the gas can be monitored. In some embodiments the rate of the flow can be measured.

If the temperature of the desolvation heater 230 is increasing more quickly than expected, this will indicate to the control system 236 that the gas flow is not flowing as quickly as is desired, and so, that attention is needed to the gas flow mechanism.

Similarly, if the temperature of the desolvation heater 230 is decreasing, or increasing more slowly than expected, this may indicate a fault in the heater 230, a fault in the sensor or that the gas flow is greater than desired.

In some embodiments the control system 236 is able to identify the flow rate of the desolvation gas flow 224, from the ratio of the power supplied to the desolvation heater 230 (power) to the temperature of the desolvation heater 230 (temperature).

In some embodiments the control system 236 will alert the user of the mass spectrometer that a fault has been detected.

Figure 3:
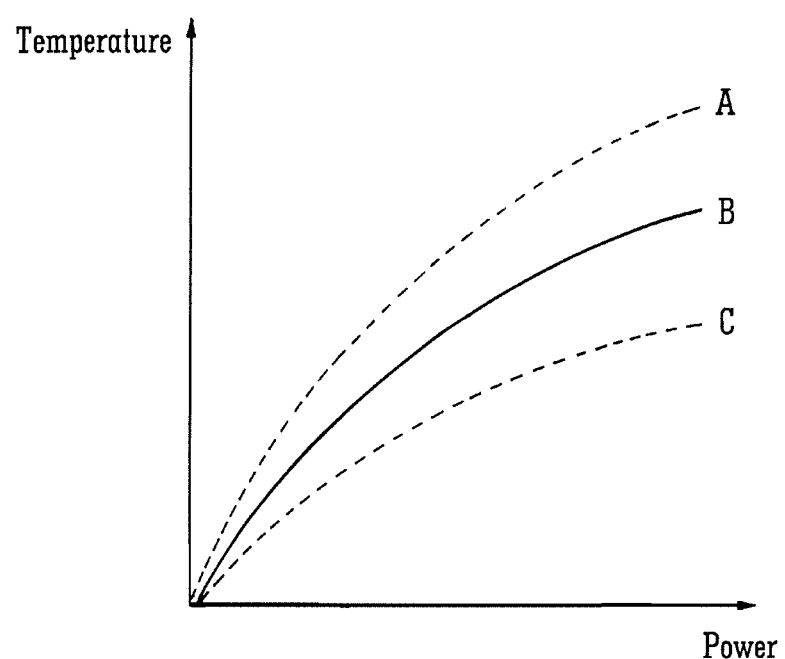
FIG. 3 is a graph showing expected power and temperature values, and indications of temperature power values that would indicate potential errors in the instrument.

FIG. 3 is a graph of power to temperature ratios when the instrument is operational.

Line A illustrates the power to temperature ratio at an upper boundary value. Should the line of power versus temperature fall above this line, there is a problem with the gas flow. This may be due to a blockage in the gas flow, the gas cylinder being empty or another problem with the gas flow.

Line C illustrates a lower boundary value. Should the line of power versus temperature fall below this line, there may be a problem with the heater, the sensor, or the gas flow may be above the desired value.

Line B shows the ideal, expected ratio of power to temperature if the gas flow is working in ideal conditions. In some embodiments the gas flow may be adjusted by the gas solenoid in order to attempt to match the ideal, expected ratio shown in line B.

In some embodiments the mass spectrometer may be a time of flight mass spectrometer, a quadrupole mass spectrometer, a 3D ion trap mass spectrometer, a 2D ion trap mass spectrometer, an orbitrap (RTM) mass spectrometer (i.e. comprising an electrostatic mass analyser arranged to generate an electrostatic field having a quadro-logarithmic potential distribution), a FT-ICR mass spectrometer, or a magnetic sector mass spectrometer.

In some embodiments the ion source may be an electrospray ion source, an atmospheric pressure chemical ionisation (APCI) ion source, an atmospheric pressure photo ionisation (APPI) ion source, an impactor-spray ion source, or any other ion source which uses a heated gas flow to aid the ionisation process.

In some embodiments the gas source may be a nitrogen generator or a gas cylinder.

In the preferred embodiment the thermal source is a heater. Examples of heaters that may be used include, but are not limited to IR heaters, inductive heaters or resistive heaters.

In some embodiments the temperature sensor may be a thermocouple, a thermistor, a semi-conductor or a device measuring the resistance of the heated item.

In some embodiments the control system may be the operating computer of the mass spectrometer. In one embodiment the control system may be incorporated in the instrument electronics (i.e. firmware). In less preferred embodiments the control system may be incorporated in the instrument control software on a control computer or a computer internal to the mass spectrometer (running software).

In some embodiments the gas valve may be a solonoid, or any other valve. Preferably the valve may be an on/off valve.

Although the present invention has been described with reference to preferred embodiments, it will be understood by those skilled in the art that various changes in form and detail may be made without departing from the scope of the invention as set forth in the accompanying claims.

The invention claimed is:

1. Apparatus comprising:
    an ion source;
    a heater for heating a gas flow to said ion source;
    a temperature sensor for monitoring the temperature of said heater; and
    a control system arranged and adapted:
    (i) to determine a flow rate of said gas flow by monitoring the power supplied to said heater and the temperature of said heater.

2. Apparatus as claimed in claim 1, wherein said gas flow is arranged and adapted to be actively used in the ionization process in said ion source.

3. Apparatus as claimed in claim 1, wherein said gas flow comprises a desolvation gas flow.

4. Apparatus as claimed in claim 1, wherein said heater comprises a resistive heater.

5. Apparatus as claimed in claim 1, wherein said heater comprises a desolvation gas heater.

6. Apparatus as claimed in claim 1, wherein said temperature sensor is arranged and adapted to monitor said temperature of said heater so as to ensure that said temperature is below a maximum value.

7. Apparatus as claimed in claim 1, wherein said temperature sensor comprises a temperature sensor for monitoring the temperature of a desolvation gas heater.

8. Apparatus as claimed in claim 1, wherein said control system is arranged and adapted to determine said flow rate of said gas flow by monitoring only said power supplied to said heater and said temperature of said heater.

9. Apparatus as claimed in claim 1, wherein said control system is arranged and adapted to determine said flow rate of said gas flow by:
    monitoring said temperature of said heater;
    determining when said temperature of said heater has stabilized; and
    then monitoring said power supplied to said heater.

10. Apparatus as claimed in claim 9, wherein said control system is arranged and adapted to determine that said temperature has stabilized when said temperature has been substantially constant for a particular period of time.

11. Apparatus as claimed in claim 10, wherein said particular period of time is selected from the group consisting of: (i) <1 s; (ii) 1-5 s; (iii) 5-10 s; (iv) 10-15 s; (v) 15-20 s; and (vi) >20 s.

12. Apparatus as claimed in claim 1, wherein said control system is arranged and adapted to determine said flow rate of said gas flow by:
    monitoring said temperature of said heater;
    determining when said temperature of said heater has stabilized to a desired value; and then monitoring said power supplied to said heater.

13. Apparatus as claimed in claim 1, wherein said control system is arranged and adapted to determine said flow rate of said gas flow by:
    monitoring the rate of change of said power supplied to said heater; and/or
    monitoring the rate of change of said temperature of said heater.

14. Apparatus as claimed in claim 1, wherein said control system is arranged and adapted to determine said flow rate of said gas flow by comparing (i) said power supplied to said heater; (ii) said temperature of said heater; (iii) a ratio of said power supplied to said heater to said temperature of said heater; (iv) a rate of change of said power supplied to said heater; (v) a rate of change of said temperature of said heater; and/or (vi) a ratio of a rate of change of said power supplied to said heater to a rate of change of said temperature of said heater, with one or more expected or threshold values.

15. Apparatus as claimed in claim 14, wherein said control system is arranged and adapted to determine said flow rate of said gas flow by determining whether (i) said power supplied to said heater; (ii) said temperature of said heater; (iii) said ratio of said power supplied to said heater to said temperature of said heater; (iv) said rate of change of said power supplied to said heater; (v) said rate of change of said temperature of said heater; and/or (vi) said ratio of said rate of change of said power supplied to said heater to said rate of change of said temperature of said heater is:
    substantially equal to or not substantially equal to said one or more expected values;
    above or below a minimum threshold value; and/or
    above or below a maximum threshold value.

16. Apparatus as claimed in claim 1, wherein said control system is arranged and adapted to determine said flow rate of said gas flow by determining whether said flow rate of said gas flow is:
    substantially equal to or not substantially equal to an expected flow rate;
    above or below a minimum threshold flow rate; and/or
    above or below a maximum threshold flow rate.

17. Apparatus as claimed in claim 16, wherein said control system is arranged and adapted:
    if said flow rate of said gas is determined to be above said maximum threshold flow rate, to reduce said flow rate of said gas; and/or
    if said flow rate of said gas is determined to be below said minimum threshold flow rate, to increase said flow rate of said gas.

18. Apparatus as claimed in claim 1, wherein said control system is arranged and adapted to provide an alert in the event of an unexpected value of or change to said temperature of said heater and/or said power supplied to said heater and/or said flow rate of said gas.

19. Apparatus as claimed in claim 1, wherein said ion source comprises an atmospheric pressure ion source.

20. Apparatus as claimed in claim 1, wherein said ion source comprises an electrospray ion source, an atmospheric pressure chemical ionization ion source, or an impactor-spray ion source.

21. A mass spectrometer comprising apparatus as claimed in claim 1.

22. A method comprising:
  providing an ion source;
  heating a gas flow using a heater and providing said gas flow to said ion source;
  monitoring the temperature of said heater; and
  determining a flow rate of said gas flow by monitoring the power supplied to said heater and the temperature of said heater.

23. A method of mass spectrometry comprising the method of claim 22.

* * * * *